(12) United States Patent
Kakuta (10) Patent No.: US 8,915,761 B2
(45) Date of Patent: Dec. 23, 2014

(54) CONNECTOR TERMINAL

(75) Inventor: Naoki Kakuta, Makinohara (JP)

(73) Assignee: Yazaki Corporation, Tokyo (JP)

( * ) Notice: Subject to any disclaimer, the term of this patent is extended or adjusted under 35 U.S.C. 154(b) by 419 days.

(21) Appl. No.: 13/321,600

(22) PCT Filed: Mar. 24, 2010

(86) PCT No.: PCT/JP2010/055129
§ 371 (c)(1),
(2), (4) Date: Jan. 18, 2012

(87) PCT Pub. No.: WO2010/134383
PCT Pub. Date: Nov. 25, 2010

(65) Prior Publication Data
US 2012/0115375 A1    May 10, 2012

(30) Foreign Application Priority Data

May 22, 2009  (JP) ................................. 2009-124263

(51) Int. Cl.
*H01R 4/18* (2006.01)
*H01R 13/03* (2006.01)
*H01R 4/62* (2006.01)

(52) U.S. Cl.
CPC ...... *H01R 13/03* (2013.01); *H01R 4/62* (2013.01); *H01R 4/185* (2013.01); *Y10S 428/929* (2013.01); *Y10S 428/935* (2013.01)
USPC ........... 439/877; 439/886; 439/887; 428/650; 428/652; 428/658; 428/647; 428/648; 428/929; 428/935

(58) Field of Classification Search
None
See application file for complete search history.

(56) References Cited

U.S. PATENT DOCUMENTS 2,815,497 A * 12/1957 Redslob ........................ 439/203
2,858,520 A * 10/1958 Chance, Jr. ................... 439/781
(Continued)

FOREIGN PATENT DOCUMENTS

| CN | 1447478 A | 10/2003 |
|---|---|---|
| CN | 101138134 A | 3/2008 |

(Continued)

OTHER PUBLICATIONS

International Search Report from the International Searching Authority [PCT/ISA/210], dated May 11 2010, issued in Application No. PCT/JP2010/055129.

(Continued)

*Primary Examiner* — John J Zimmerman
(74) *Attorney, Agent, or Firm* — Sughrue Mion, PLLC (57) ABSTRACT

A connector terminal which can achieve high mechanical connection strength and stabilized low electrical connection resistance when it is crimped to an aluminum electric wire, and in addition, can suppress electrical contact resistance low when it is fitted to a mating connector terminal is provided. In a connector terminal (1A) having an electrical contact section (10) which is brought into contact and conducted with a mating connector terminal by fitting to the mating connector terminal, and a conductor crimping section (12) which is crimped to the conductor of an electric wire, a metal material which constitutes the terminal uses aluminum or an aluminum alloy as a base material (100), a Zn layer (101) having a thickness in the range from 0.1 μm to 2.0 μm by electroless plating and a Cu layer (102) having a thickness in the range from 0.5 μm to 1.0 μm by electrolytic plating are formed in sequence on the surface of the base material (100), and an Sn layer (105) having a thickness in the range from 0.7 μm to 1.7 μm by electrolytic plating is formed on the outermost surface.

2 Claims, 7 Drawing Sheets

(56) References Cited

U.S. PATENT DOCUMENTS

| | | | |
|---|---|---|---|
| 3,915,667 A * | 10/1975 | Ricks | 428/648 |
| 3,993,238 A * | 11/1976 | Brook et al. | 228/198 |
| 6,942,529 B2 | 9/2005 | Fujimoto et al. | |
| 2003/0186597 A1 | 10/2003 | Suzuki et al. | |
| 2004/0157504 A1 | 8/2004 | Fujimoto et al. | |
| 2006/0102368 A1 * | 5/2006 | Michel epouse Allaire et al. | 174/36 |
| 2006/0292922 A1 * | 12/2006 | Froschl | 439/442 |
| 2008/0188100 A1 | 8/2008 | Saitoh | |
| 2009/0061253 A1 | 3/2009 | Yoshida et al. | |
| 2010/0167085 A1 * | 7/2010 | Sun et al. | 428/650 |
| 2011/0045713 A1 * | 2/2011 | Ono et al. | 439/877 |
| 2013/0072075 A1 * | 3/2013 | Kayamoto | 439/887 |

FOREIGN PATENT DOCUMENTS

| | | | |
|---|---|---|---|
| CN | 101384755 A | | 3/2009 |
| GB | 755272 | * | 8/1956 |
| GB | 790015 | * | 1/1958 |
| JP | 2003-147579 A | | 5/2003 |
| JP | 2003-229192 | * | 8/2003 |
| JP | 2004-193073 A | | 7/2004 |
| JP | 2005-116236 A | | 4/2005 |
| JP | 2006-291340 A | | 10/2006 |
| JP | 2006-291340 A | | 10/2006 |
| JP | 2006291340 A | | 10/2006 |
| JP | 2004-199927 A | | 7/2007 |
| JP | 2007-247060 A | | 9/2007 |

OTHER PUBLICATIONS

Written Opinion of the International Searching Authority [PCT/ISA/237], dated May 11, 2010, issued in Application No. PCT/JP2010/055129.

Communication dated Sep. 26, 2013 issued by the State Intellectual Property Office of the People's Republic of China in counterpart Chinese Patent Application No. 201080022557.5.

Communication issued Jun. 10, 2014, by the State Intellectual Property Office of PR of China, in corresponding Application No. 201080022557.5.

Japanese Office Action; Application No. 2009-124263, May 24, 2013 English translation.

* cited by examiner

| KIND OF LAYER | | KIND OF METAL | FILM THICKNESS (μm) |
|---|---|---|---|
| SURFACE-TREATED LAYER | ELECTROLYTICALLY PLATED LAYER | Sn | 0.7~1.7 |
| | ELECTROLYTICALLY PLATED LAYER | Cu | 0.5~1.0 |
| | ELECTROLESS PLATED LAYER (ZINCATE TREATMENT) | Zn | 0.1~2.0 |
| BASE MATERIAL | | Al OR Al ALLOY | |

FIG. 4

| KIND OF LAYER | | KIND OF METAL | FILM THICKNESS (μm) |
|---|---|---|---|
| SURFACE-TREATED LAYER | ELECTROLYTICALLY PLATED LAYER | Sn | 0.3~1.2 |
| | ELECTROLYTICALLY PLATED LAYER | Cu | 0.1~0.7 |
| | ELECTROLYTICALLY PLATED LAYER | Ni | 0.1~2.0 |
| | ELECTROLESS PLATED LAYER (ZINCATE TREATMENT) | Zn | 0.1~2.0 |
| BASE MATERIAL | | Al OR Al ALLOY | |

| | (THIN) ← THICKNESS (μm) → (THICK) | | | | |
|---|---|---|---|---|---|
| | 0.5 | 1.0 | 1.5 | 2.0 | |
| Zu | △ | ○ | ○ | ○ | △ |
| Ni | △ | ○ | ○ | ○ | △ |
| Cu | △ | ○ | △ | × | × |
| Sn | × | △ | ○ | △ | × |

FIG. 7

CONNECTOR TERMINAL

FIELD OF THE INVENTION

The present invention relates to a connector terminal used in a connector.

BACKGROUND ART

Connector terminal generally used in a connector is constituted of a metallic material including copper (Cu) or a copper (Cu) alloy, having tin (Sn) plated thereon, and has an electrical contact section which is brought into contact and conducted with a mating connector terminal by fitting to the mating connector terminal in a front section thereof and a conductor crimping section which is crimped to a conductor of an electric wire at a rear section thereof.

The reason for applying Sn plating to the surface of a terminal base material is that Sn is very soft, spontaneous oxide coating of Sn can easily be mechanically destroyed by contact load between terminals in fitting connector terminals to each other, newly-formed surfaces of Sn can be contacted to each other, and as a result, good contact performance (that is, low and stabilized contact resistance) can stably be maintained over a long period of time.

Where the Sn plated layer is not present, an oxide coating of a hard copper (or copper alloy) base material appears on the surface, and as a result, mechanical destruction of the surface layer at the time of fitting a terminal to the base material cannot be expected. Furthermore, because the oxide coating of copper has very high volume resistivity, contact resistance between terminals is apt to become high.

By the way, recently an aluminum electric wire begun to be used in place of a copper electric wire even in the field of electric wire harness for automobiles for the purpose of reduction in weight and improvement in recycle property. The aluminum electric wire is an electric wire having an aluminum-made or aluminum alloy-made conductor section.

In the case of using the aluminum electric wire, crimping of a terminal particularly becomes a problem.

In the case that the conductor crimping part of the connector terminal is crimped to an aluminum (or aluminum alloy) core of the aluminum electric wire, electrical resistance of the crimping connection part is apt to become high due to, for example, difference in springback properties and difference in coefficient of thermal expansion, between aluminum (or aluminum alloy) and copper (or copper alloy). For this reason, in the case of crimping a copper terminal to an aluminum electric wire, overcrimping stronger than the general crimping is performed in order to suppress electrical resistance low. The overcrimping is a manner of crimping in which compressibility is large as compared with the case of crimping a copper terminal to a copper electric wire, and is that, for example, conductor compressibility is 60% or less.

However, the case that overcrimping has been performed gives rise to the problem that the core of an electric wire is too compressed, and as a result, in the case of receiving tensile load in an axial direction, the electric wire becomes easy to be broken in the crimping section (that is, decrease in strength in crimping section).

Figure 7:
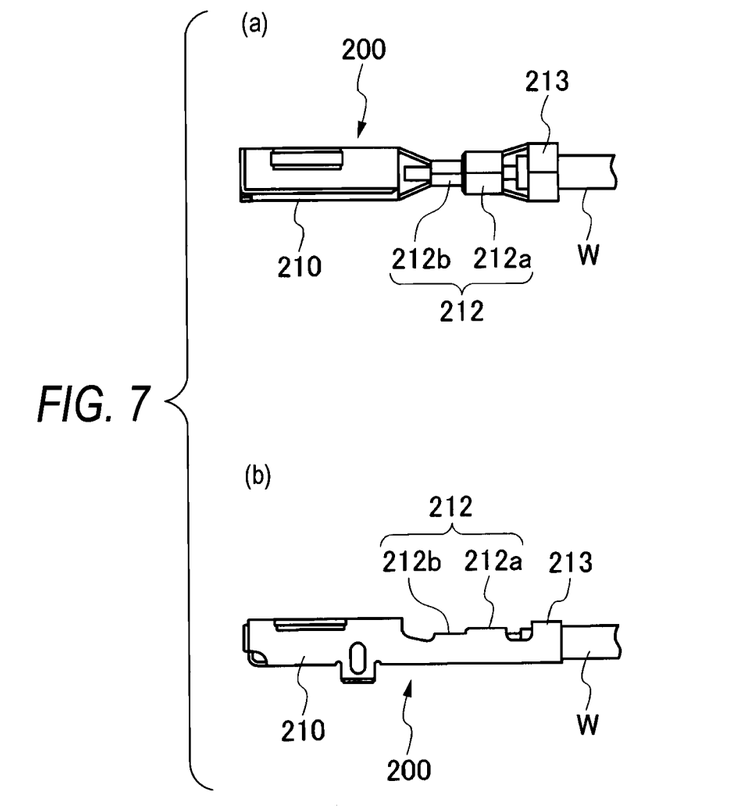
FIG. 7(a) is a plane view of the conventional connector terminal.
FIG. 7(b) is a side view of the connector terminal.

In view of the above, for example, in a crimp structure shown in Patent Document 1, as shown in FIG. 7, difference in level for separating a front side part and a rear side part is provided on a conductor crimp section 212 of a connector terminal 200, a terminal is weakly crimped to an aluminum electric wire in a crimping section 212a at a rear side (that is, with conductor compressibility to the same extent as the case to a copper wire), and is strongly crimped to an aluminum electric wire in a crimping section 212b at a front side (that is, with large conductor compressibility). Thus, by performing the crimping in two stages, both electrical connection performance and mechanical connection performance are attempted to achieve. At the front side of the conductor crimping section 212, an electrical contact section 210 which is brought into contact and conducted with a mating connector terminal by fitting to the mating connector terminal is provided, and at the rear side of the conductor crimping section 212, a covering swage section 213 swaged to an insulating cover-attached section of an electric wire W.

PRIOR ART REFERENCES

Patent Document

Patent Document 1: JP-A-2005-116236

SUMMARY OF THE INVENTION

Problems that the Invention is to Solve

However, a crimping while maintaining difference in the conductor compressibility makes a crimp processing very difficult, and there is high possibility that either of electrical connection performance or mechanical connection performance is sacrificed.

Furthermore, in view of the fact that the conventional connector terminal is prepared using copper or a copper alloy as a matrix metal, in the case of fabricating a connector, the weight of the resulting assembly is easy to be increased.

In view of the above circumstances, the present invention has an object to provide a connector terminal which particularly can achieve high mechanical connection strength and stabilized low electrical connection resistance when the connector terminal is crimped to an aluminum electric wire, and, in addition, the connector terminal can suppress electrical contact resistance low when the connector terminal is fitted to a mating connector terminal.

Means for Solving the Problems (1) To solve the above problem, the connector terminal according to the present invention includes an electrical contact section which is brought into contact and conducted with a mating connector terminal by fitting to the mating connector terminal, and a conductor crimping section which is crimped to the conductor of an electric wire, wherein a metal material which constitutes the terminal has a base material based on an aluminum or an aluminum alloy, a Zn layer and a Cu layer are formed in sequence on a surface of the base material, and an Sn layer is formed on the outermost surface.

(2) The Zn layer of the connector terminal in the above (1) is preferably formed by electroless plating, and the Cu layer and the Sn layer are preferably formed by electrolytic plating.

(3) It is preferred in the connector terminal in the above (1) or (2) that thickness of the Zn layer is set to a range from 0.1 µm to 2.0 µm, thickness of the Cu layer is set to a range from 0.5 µm to 1.0 µm and thickness of the Sn layer is set to a range from 0.7 µm to 1.7 µm.

(4) The connector terminal according to the present invention includes an electrical contact section which is brought into contact and conducted with a mating connector terminal by fitting to the mating connector terminal, and a conductor crimping section which is crimped to the conductor of an electric wire, wherein a metal material which constitutes the terminal has a base material based on an aluminum or an aluminum alloy, and a Zn layer, an Ni layer and a Cu layer are formed in sequence on a surface of the base material, and an Sn layer is formed on the outermost surface.

(5) It is preferred in the connector terminal in the above (4) that the Zn layer is formed by electroless plating, and the Ni layer, Cu layer and Sn layer are formed by electrolytic plating.

(6) It is preferred in the connector terminal in the above (4) or (5) that thickness of the Zn layer is set to the range from 0.1 μm to 2.0 μm, thickness of the Ni layer is set to a range from 0.1 μm to 2.0 μm, thickness of the Cu layer is set to the range from 0.1 μm to 0.7 μm, and thickness of the Sn layer is set to the range from 0.3 μm to 1.2 μm.

Advantageous Effects of the Invention

According to the invention of the above (1), because aluminum or an aluminum alloy is used as a terminal base material, the weight of the terminal can be reduced to about ⅓ the weight of a copper terminal, and this can contributes to a reduction in weight of a wire harness. Furthermore, in the case that the connector terminal of the present invention is crimped to an aluminum electric wire, the conductor of an electric wire and the terminal are the same type of a material. Therefore, decrease in crimping force by the influence of springback and influence of difference in thermal expansion can be avoided without overcrimping or crimping in two stages as in the conventional case, and as a result, both the mechanical connection performance and the electrical connection performance can be achieved. Furthermore, the presence of the Sn layer on the outermost surface of the electrical contact section can improve electrical contact reliability to a mating terminal.

In this case, because the Zn layer is provided as an underlayer of the Sn layer, the Sn layer can be formed by electroplating with good efficiency. Furthermore, because the Cu layer is interposed between the Zn layer and the Sn layer, the component element (Al) of the base material and Zn as a base diffuse in the surface of the Sn layer, and this can prevent the inherent performance of the Sn layer from being deteriorated.

That is, when Zn reaches the outermost surface and forms an oxide coating thereof, volume resistivity of an oxide of Zn is higher than that of an oxide of Sn, and this leads to an increase in contact resistance. The Cu layer functions to suppress the increase of contact resistance. An oxide of Cu has high volume resistance, leading to an increase in the contact resistance. However, diffusion rate into Sn greatly differs between Cu and Zn, and the influence of diffusion of Cu can be disregarded. Specifically, Zn causes grain boundary diffusion in Sn at very high speed, but Cu diffuses in Sn in the form of intraparticle diffusion. The intraparticle diffusion has very low speed as compared with the grain boundary diffusion. For this reason, by that the Cu layer is interposed, life-prolonging effectiveness on the practical use is obtained. However, where the Cu layer has large thickness, there is a possibility that an absolute amount of Cu diffused is increased. For this reason, the Cu layer should have smaller thickness as possible, thereby reducing the amount supplied by diffusion.

According to the invention of the above (2), because the Zn layer is formed by electroless plating, and the Cu layer and the Sn layer are formed by electrolytic plating, clean layer structure can be formed with good efficiency.

According to the invention of the above (3), because the thickness of the Zn layer is set to the range from 0.1 μm to 2.0 μm, the thickness of the Cu layer is set to the range from 0.5 μm to 1.0 μm, and the thickness of the Sn layer is set to the range from 0.7 μm to 1.7 μm, electrical contact reliability and terminal fittability when fitted to a mating connector terminal can be increased.

That is, where the thickness of the Sn layer on the outermost surface is less than 0.7 μm, the Sn layer abrades when applied to a vehicle-mounted connector, and a base is easily exposed, leading to a decrease in contact reliability. On the other hand, where the thickness of the Sn layer exceeds 1.7 μm, such a thickness leads to an increase in insertion force when fitted to a mating connector terminal, resulting in deterioration of terminal fittability. Furthermore, where the thickness of the Cu layer provided to prevent diffusion of Zn in the Sn layer is less than 0.5 μm, the barrier effect of suppressing diffusion of Zn in the Sn layer is impaired. On the other hand, the thickness of the Cu layer exceeds 1.0 μm, the thickness of a Cu—Sn alloy layer is increased by surface diffusion of Cu element itself in the Sn layer, leading to deterioration of contact reliability. Furthermore, because electrolytic plating cannot directly be applied to the base material which is aluminum or an aluminum alloy, a treatment called a zincate treatment is conducted to form a Zn layer. Where the thickness of the Zn layer is less than 0.1 μm, electrodeposition property of Cu plating applied to the Zn layer is impaired. On the other hand, where the thickness of the Zn layer exceeds 2.0 μm, productivity is impaired as a consequence of electroless plating. For the above reasons, the thickness is limited to the above range, and as a result, electrical contact reliability and terminal fittability when fitted to a mating connector terminal are enhanced.

According to the invention of the above (4), because aluminum or an aluminum alloy is used as the terminal base material, similar to the invention of (1) above, the weight can be reduced to about ⅓ the weight of a copper terminal, and this can contribute to reduction in weight of a wire harness. In the case that the terminal connector of the present invention is crimped to an aluminum electric wire, the conductor of the electric wire and the terminal are the same type of a material. Therefore, decrease in the crimping force by the influence of springback and the influence of difference in thermal expansion can be avoided from being decreased, without overcrimping and without crimping in two stages as the conventional case, and as a result, both the mechanical connection performance and the electrical connection performance can be achieved. Furthermore, from that the Sn is present on the outermost surface of the electrical contact section, the electrical contact reliability to a mating terminal can be improved.

In this case, because the Zn layer is provided as an underlying layer of the Sn layer, the Sn layer can be formed by electroplating with good efficiency. Furthermore, because the Ni layer and the Cu layer are interposed between the Zn layer and the Sn layer, the phenomenon that the component element (Al) of the base material and Zn as a base diffuse in the surface of the Sn layer and the inherent performance of the Sn layer are deteriorated can be prevented.

That is, when Zn reaches the outermost surface and forms an oxide coating thereof, because the oxide of Zn has volume resistivity higher than that of an oxide of Sn, contact resistance is increased. The Ni layer and the Cu layer function to suppress the increase. In the case that the thickness of the Sn layer is decreased as compared with the thickness in general uses in order to reduce friction coefficient when fitting the terminal and insert the terminal with low force, the underlying metal easily diffuses in the outermost surface as compared with the case that the thickness of the Sn layer is increased. However, the diffusion of the component element (Al) of the base material and Zn in the Sn layer can effectively be suppressed by providing two intermediate layers, the Ni layer and the Cu layer. Furthermore, the phenomenon that Ni directly contacts Sn and diffuses therein can be prevented by providing the Cu layer on the Ni layer.

According to the invention of the above (5), because the Zn layer is formed by electroless plating, and the Ni layer, the Cu layer and the Sn layer are formed by electrolytic plating, clean layer structure can be formed with good efficiency.

According to the invention of the above (6), because the thickness of the Zn layer is set to the range from 0.1 μm to 2.0 μm, the thickness of the Ni layer is set to the range from 0.1 μm to 2.0 μm, the thickness of the Cu layer is set to the range from 0.1 μm to 0.7 μm, and the thickness of the Sn layer is set to the range from 0.3 μm to 1.2 μm, electrical contact reliability and terminal fittability when fitted to a mating connector terminal can be enhanced.

That is, where the thickness of the Sn layer on the outermost surface is less than 0.3 μm, the Sn layer abrades when applied to an automobile-mounted connector, and a base is easily exposed, leading to a decrease in contact reliability. On the other hand, where the thickness of the Sn layer exceeds 1.2 μm, such a thickness leads to an increase in insertion force when fitted to a mating connector terminal, resulting in deterioration of terminal fittability. Furthermore, where the thickness of the Cu layer provided to prevent diffusion of Zn and Ni in the Sn layer is less than 0.1 μm, the barrier effect of suppressing diffusion of Zn and Ni in the Sn layer is impaired. On the other hand, where the thickness of the Cu layer exceeds 0.7 μm, the thickness of a Cu—Sn alloy layer is increased by diffusion of Cu element itself to the surface of the Sn layer, leading to a decrease in contact reliability. Furthermore, where the thickness of the Ni layer provided to prevent diffusion of the component elements of the base material and Zn in the Sn layer is less than 0.1 μm, the barrier effect of suppressing diffusion of the component elements of the base material and Zn in the Sn layer is impaired. On the other hand, where the thickness of the Ni layer exceeds 2.0 μm, such a thickness affects springback characteristics when crimped, leading to a decrease in contact reliability of the crimping section. Furthermore, because electrolytic plating cannot directly be applied to aluminum or an aluminum alloy as the base material, a treatment called zincate treatment is conducted to form the Zn layer. In this case, where the thickness of the Zn layer is less than 0.1 μm, electrodeposition property of Ni plating applied to the Zn layer is impaired. On the other hand, where the thickness of the Zn layer exceeds 2.0 μm, productivity is impaired as a consequence of electroless plating. For the above reasons, the thickness is limited to the above range, and as a result, electrical contact reliability and terminal fittability when fitted to a mating connector terminal are enhanced.

BRIEF DESCRIPTION OF THE DRAWINGS

FIG. 1(a) is an appearance perspective view of the terminal connector, and FIG. 1(b) is a cross-sectional view showing a layer structure of a surface of a connector terminal material.

FIG. 2(a) is an appearance perspective view of the terminal connector, and FIG. 2(b) is a cross-sectional view showing a layer structure of a surface of a connector terminal material.

MODE FOR CARRYING OUT THE INVENTION

The embodiment of the present invention is described below by reference to the drawings.

Figure 1:
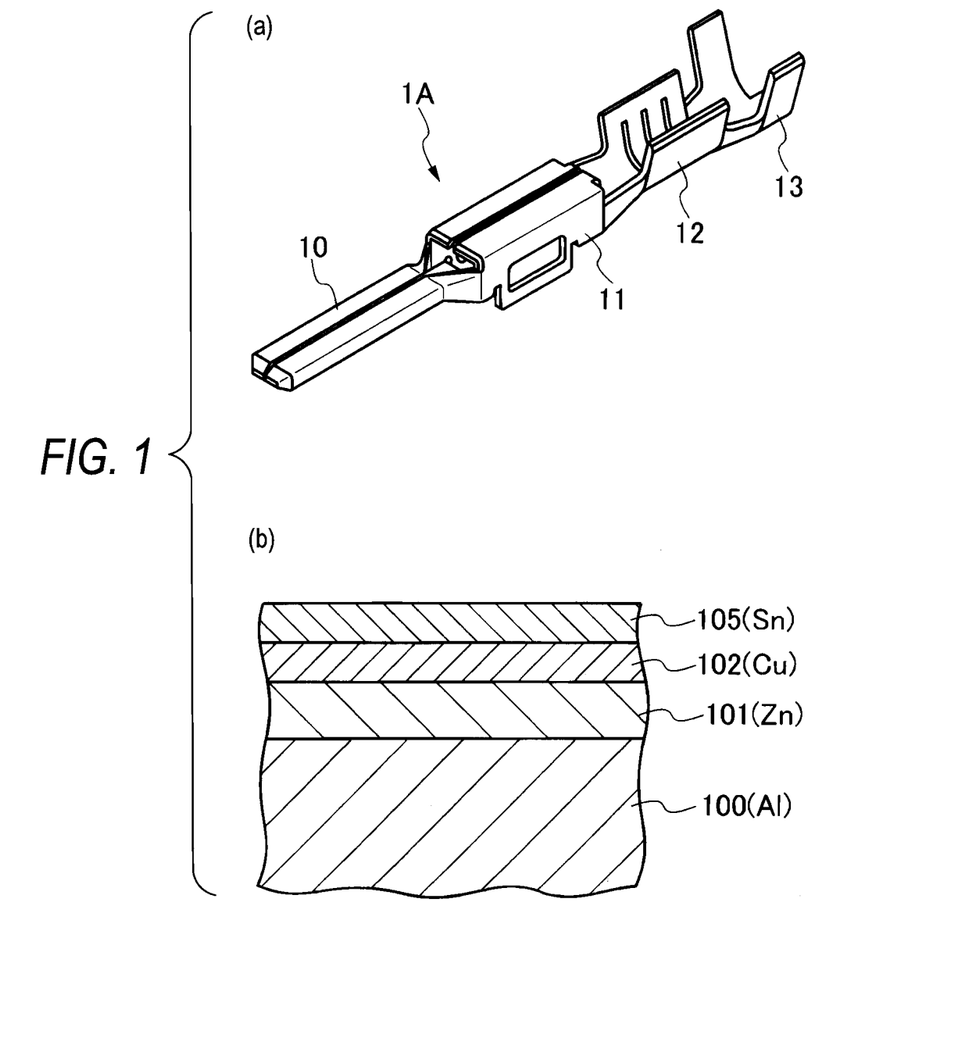
FIG. 1 shows a constitution of a connector terminal according to a first embodiment of the present invention.

FIG. 1 shows a constitution of a connector terminal of a first embodiment of the present invention. FIG. 1(a) is an appearance perspective view of the terminal connector, and FIG. 1(b) is a cross-sectional view showing a layer structure of a surface of a connector terminal material.

As shown in FIG. 1(a), a connector terminal 1A includes, in terms of shape, an electrical contact section 10 which is brought into contact and conducted with a mating connector terminal by fitting to the mating connector terminal, in a front section, a conductor crimping section 12 which is crimped to a conductor of an electric wire through a box section 11, in a rear side of the front section, and a covering swage section 13 swaged to an insulating cover-attached part of an electric wire, in further rear side.

Figure 3:
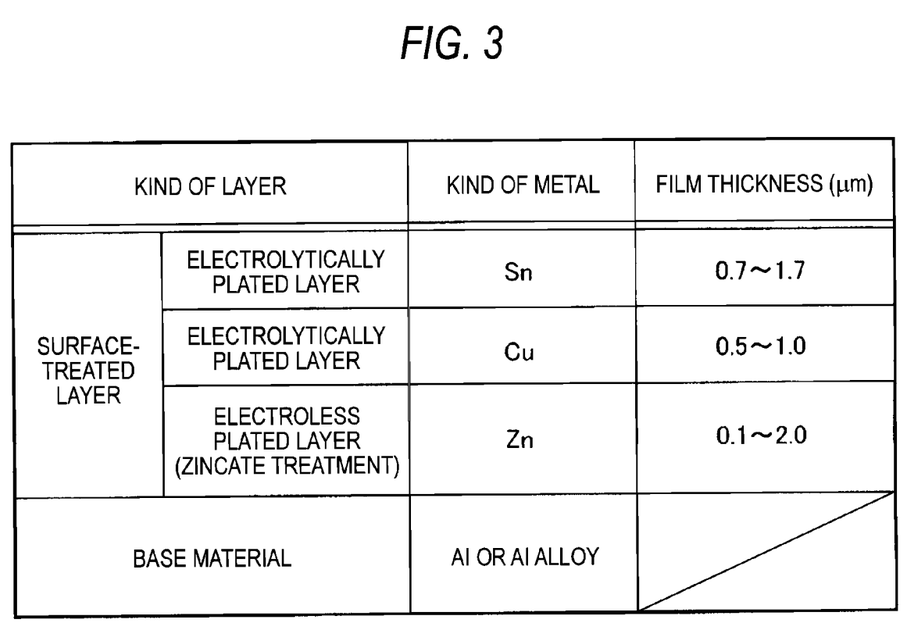
FIG. 3 is a diagram showing each layer thickness (film thickness) in the layer structure of the surface of the connector terminal of the first embodiment.

In the connector terminal 1A, as shown in FIG. 1(b) and FIG. 3, metal plate materials constituting the connector terminal 1A are constituted of aluminum or an aluminum alloy as a base material 100; a Zn layer (zinc layer) 101 having a thickness in the range from 0.1 μm to 2.0 μm by electroless plating, and a Cu layer (copper layer) 102 having a thickness in the range from 0.5 μm to 1.0 μm by electrolytic plating, in sequence, on the surface of the base material 100; and an Sn layer (zinc layer) 105 having a thickness in the range from 0.7 μm to 1.7 μm by electrolytic plating, on the outermost surface. In this embodiment, the connector terminal is a connector terminal applied to a connector with a general insertion force. For this reason, the thickness of the Sn layer 105 on the outermost surface is set to the range from 0.7 μm to 1.7 μm.

In this case, the Sn layer 105 is provided to improve electrical contact reliability and fitting performance when fitting to a mating connector terminal. Furthermore, the Zn layer 101 is formed as an underlying layer for electrolytically plating the Sn layer 105. Oxides of aluminum and an aluminum alloy have very high volume resistivity, and therefore cannot sufficiently be removed by merely dipping in an acid for a pre-treatment of electroplating. For this reason, the Zn layer 101 is first formed by electroless plating (zincate treatment). The method is that Zn plating is applied while removing aluminum oxide by a reduction reaction without applying voltage from the outside. By thus forming the Zn layer 101, electrolytic plating becomes first possible.

The Cu layer 102 is provided to prevent that the component element (Al) as the base material 100 and Zn of the Zn layer as the base diffuse in the Sn layer 105 on the outermost surface, thereby deteriorating the inherent performance of the Sn layer 105.

According to the connector terminal 1A constituted as above, because aluminum or an aluminum alloy is used as the terminal base material 100, the weight can be reduced to about ⅓ the weight of a copper terminal, and this contributes to reduction in weight of a wire harness.

In the case of crimping the connector terminal 1A to an aluminum electric wire, a conductor of the electric wire and the terminal are the same type of the material. Therefore, decrease in crimping force by the influence of springback and the influence of thermal expansion difference can be avoided without overcrimping and crimping in two stages as in the conventional case. As a result, both the mechanical connection performance and the electrical connection performance can be achieved. Furthermore, the presence of the Sn layer 105 on the outermost surface of the electrical contact section can improve electrical contact reliability to a mating terminal.

In this case, because the Zn layer 101 is provided as an underlying layer of the Sn layer 105, the Sn layer 105 can be formed by electroplating with good efficiency. Furthermore, because the Cu layer 102 is interposed between the Zn layer 101 and the Sn layer 105, this constitution can prevent the phenomenon that the component element (Al) of the base material 100 and Zn as the base diffuse in the surface of the Sn layer 105 and the inherent performance of the Sn layer 105 is deteriorated.

That is, when Zn reaches the outermost surface and forms an oxide coating thereof, an oxide of Zn has volume resistivity larger than that of an oxide of Sn, leading to an increase in contact resistance. The Cu layer 102 functions to suppress the increase.

An oxide of Cu has high volume resistivity, leading to an increase in volume resistivity. However, the diffusion rate in Sn greatly differs between Cu and Zn, and the influence of diffusion of Cu can be disregarded. That is, Zn causes grain boundary diffusion in Sn at very high speed, but Cu diffuses in Sn in a form of intraparticle diffusion. The intraparticle diffusion has very low speed as compared with the grain boundary diffusion. For this reason, by that the Cu layer is interposed, life-prolonging effectiveness on the practical use is obtained. However, where the Cu layer 102 has large thickness, there is a possibility that an absolute amount of Cu diffused is increased. Therefore, the Cu layer 102 should have smaller thickness as possible, thereby reducing the amount supplied by diffusion.

According to the connector terminal 1A, because the Zn layer 101 is formed by electroless plating, and the Cu layer 102 and the Sn layer 105 are formed by electrolytic plating, clean layer structure can be prepared with good efficiency.

Furthermore, because the thickness of the Zn layer 101 is set to the range from 0.1 μm to 2.0 μm, the thickness of the Cu layer 102 is set to the range from 0.5 μm to 1.0 μm and the thickness of the Sn layer 105 is set to the range from 0.7 μm to 1.7 μm, electrical contact reliability and terminal fittability when fitted to a mating connector terminal can be enhanced.

That is, where the thickness of the Sn layer 105 as the outermost surface is less than 0.7 μm, in the case of being applied to a vehicle-mounted connector, the Sn layer 105 abrades and a base is easily exposed, leading to deterioration of contact reliability. On the other hand, where the thickness of the Sn layer 105 exceeds 1.7 μm, such a thickness leads to an increase in insertion force when fitted to a mating connector terminal, resulting in deterioration of terminal fittability.

Where the thickness of the Cu layer 102 provided to prevent diffusion of Zn in the Sn layer is less than 0.5 μm, the barrier effect of suppressing diffusion of Zn in the Sn layer is impaired. On the other hand, where the thickness of the Cu layer 102 exceeds 1.0 μm, the thickness of a Cu—Sn alloy layer is increased by diffusion of Cu element itself in the surface of the Sn layer, leading to deterioration of contact reliability.

Where the thickness of the Zn layer 101 is less than 0.1 μm, electrodeposition property of Cu plating applied to the Zn layer 101 is impaired. On the other hand, where the thickness of the Zn layer 101 exceeds 2.0 μm, productivity is impaired as a consequence of electroless plating.

Figure 5:
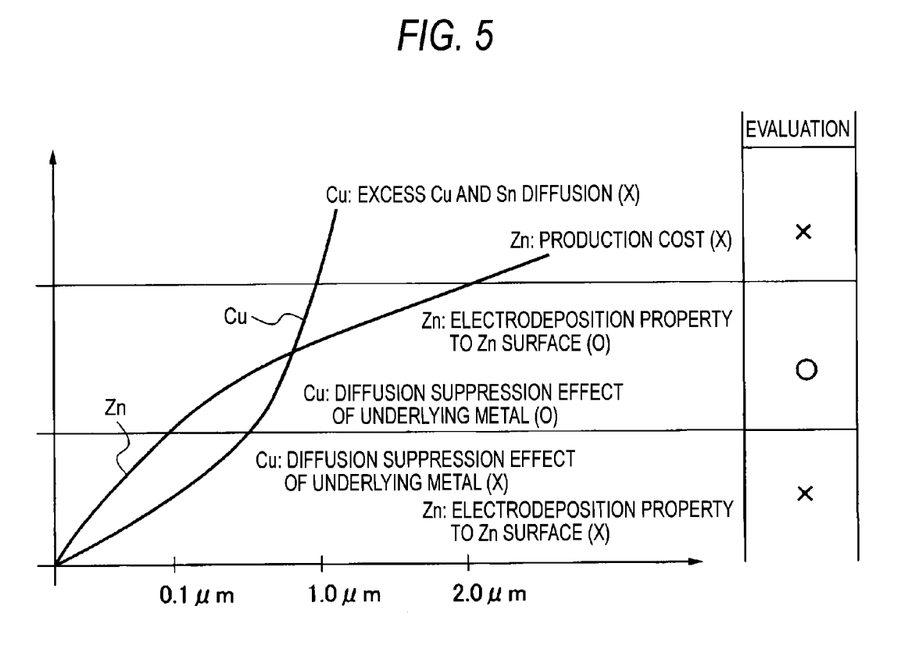
FIG. 5 is an explanatory view showing evaluation contents of thicknesses of a Cu layer and a Zn layer in the layer structure of the surface of the connector terminal of the first embodiment.

FIG. 5 shows the evaluation contents of the thickness of the Cu layer 102 and the thickness of the Zn layer 101. In the column of evaluation, "o" means "Good", and "x" means "Poor". As physical quantities as evaluation object in the drawing, there are the following elements.

(1) Physical quantity showing electrical contact reliability: Contact resistance mΩ

(2) Physical quantity corresponding to insertion force of connector: Friction coefficient and insertion force N (3) Physical quantity showing barrier effect of diffusion prevention: Diffusion coefficient (showing easiness of diffusion)

Figure 2:
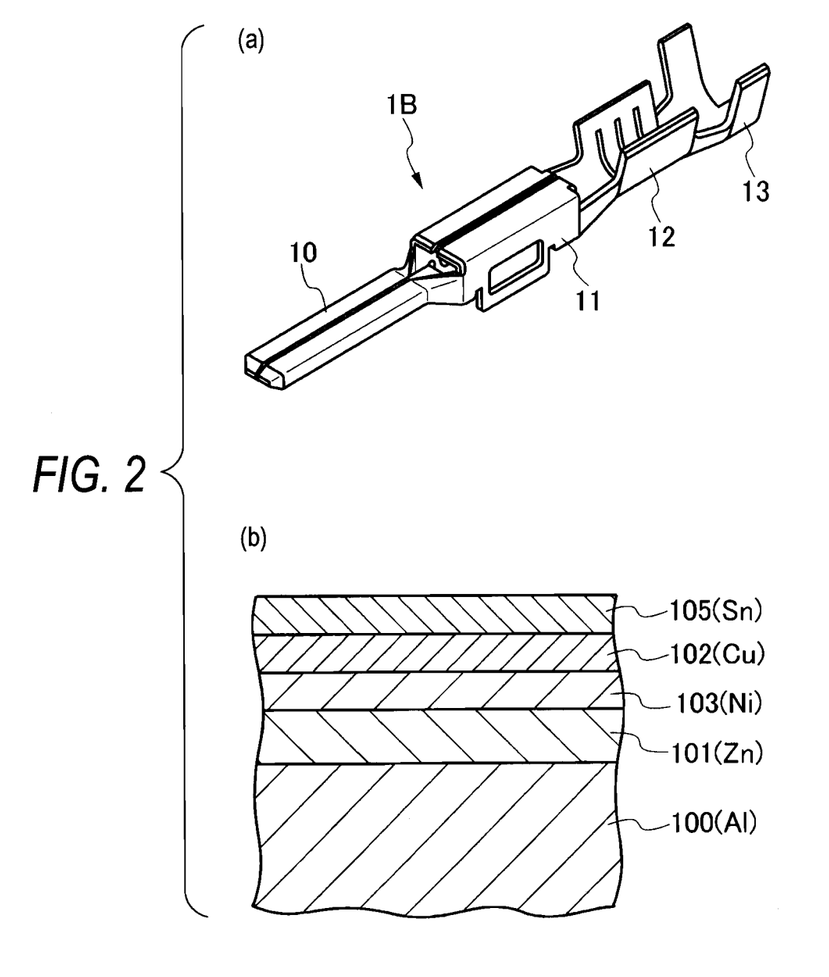
FIG. 2 shows a constitution of a connector terminal according to a second embodiment of the present invention.

Diffusion coefficient $D = D_0 e^{(-Q/RT)}$ $D_0$: Frequency factor (or frequency term) m²/sec
Q: Activation energy of diffusion J/mol
R: Gas constant J/(K·mol)
T: Absolute temperature K (4) Physical quantity showing reliability of crimping section: Crimping section electric resistance mΩ or crimping section strength N FIG. 2 shows a constitution of a connector terminal of the second embodiment. FIG. 2(a) is an appearance perspective view of the terminal connector, and FIG. 2(b) is a cross-sectional view showing a layer structure of a surface of a connector terminal material.

As shown in FIG. 2(a), a connector terminal 1B includes, in terms of shape, an electrical contact section 10 which is brought into contact and conducted with a mating connector terminal by fitting to the mating connector terminal, in a front section, a conductor crimping section 12 which is crimped to a conductor of an electric wire through a box section 11, in a rear side of the front section, and a covering swage section 13 swaged to an insulating cover-attached part of an electric wire, in further rear side.

Figure 4:
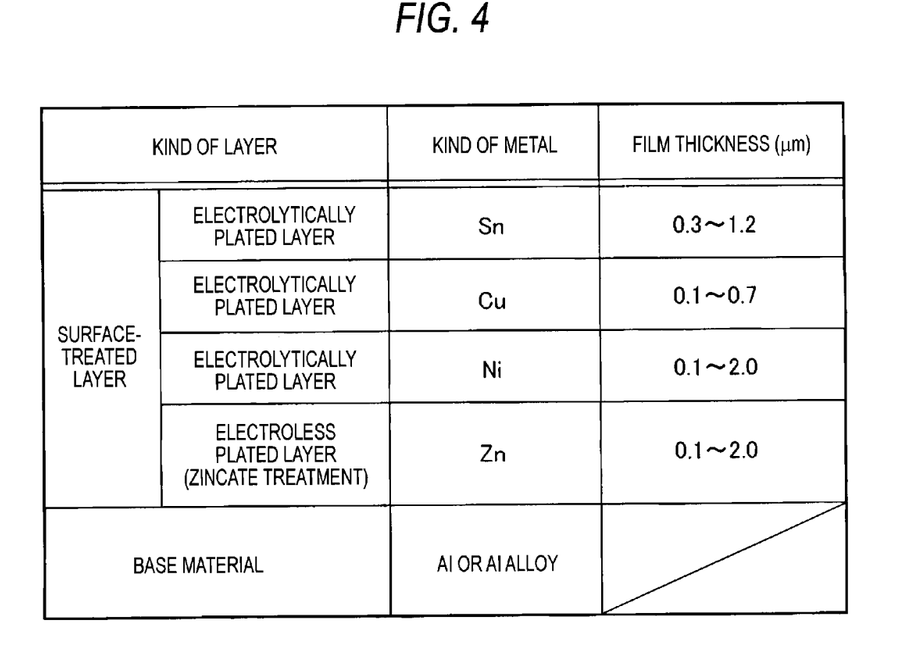
FIG. 4 is a diagram showing each layer thickness (film thickness) in the layer structure of the surface of the connector terminal of the second embodiment.

In the connector terminal 1B, as shown in FIG. 2(b) and FIG. 4, metal plate materials constituting the connector terminal 1B are constituted of aluminum or an aluminum alloy as a base material 100; a Zn layer (zinc layer) 101 having a thickness in the range from 0.1 μm to 2.0 μm by electroless plating, an Ni layer (nickel layer) 103 having a thickness in the range from 0.1 μm to 2.0 μm by electrolytic plating, and a Cu layer (copper layer) 102 having a thickness in the range from 0.1 μm to 0.7 μm by electrolytic plating, in sequence, on the surface of the base material 100; and an Sn layer (zinc layer) 105 having a thickness in the range from 0.3 μm to 1.2 μm by electrolytic plating, on the outermost surface. In this embodiment, the connector terminal is a connector terminal for a connector with low insertion force. For this reason, the thickness of the Sn layer 105 on the outermost surface is set to the range from 0.3 μm to 1.2 μm, which is smaller than the thickness of the first embodiment.

In this case, the Sn layer 105 is provided to improve electrical contact reliability and fitting performance when fitting to a mating connector terminal. Furthermore, the Zn layer 101 is formed as an underlying layer for electrolytically plating the Sn layer 105. Oxides of aluminum and an aluminum alloy have very high volume resistivity, and therefore cannot sufficiently be removed by merely dipping in an acid for a pre-treatment of electroplating. For this reason, the Zn layer 101 is first formed by electroless plating (zincate treatment). The method is that Zn plating is applied while removing aluminum oxide by a reduction reaction without applying voltage from the outside. By thus forming the Zn layer 101, electrolytic plating becomes first possible.

The Ni layer 103 and the Cu layer 102 are provided to prevent that the component element (Al) as the base material 100 and Zn of the Zn layer as the base diffuse in the Sn layer 105 on the outermost surface, thereby deteriorating the inherent performance of the Sn layer 105. Of those, the Cu layer 102 is provided to avoid that Ni diffuses in the Sn layer 105.

According to the connector terminal 1B constituted as above, because aluminum or an aluminum alloy is used as the terminal base material 100 similar to the connector terminal of the first embodiment, the weight can be reduced to about ⅓ the weight of a copper terminal, and this contributes to reduction in weight of a wire harness.

In the case of crimping the connector terminal 1B to an aluminum electric wire, a conductor of the electric wire and the terminal are the same type of the material. Therefore, decrease in crimping force by the influence of springback and the influence of thermal expansion difference can be avoided without overcrimping and crimping in two stages as in the conventional case. As a result, both the mechanical connection performance and the electrical connection performance can be achieved. Furthermore, the presence of the Sn layer 105 on the outermost surface of the electrical contact section can improve electrical contact reliability to a mating terminal.

In this case, because the Zn layer 101 is provided as an underlying layer of the Sn layer 105, the Sn layer 105 can be formed by electroplating with good efficiency. Furthermore, because the Ni layer 103 the Cu layer 102 are interposed between the Zn layer 101 and the Sn layer 105, this constitution can prevent the phenomenon that the component element (Al) of the base material 100 and Zn as the base diffuse in the surface of the Sn layer 105 and the inherent performance of the Sn layer 105 is deteriorated.

That is, when Zn reaches the outermost surface and forms an oxide coating thereof, an oxide of Zn has volume resistivity larger than that of an oxide of Sn, leading to an increase in contact resistance. The Ni layer 103 and the Cu layer 102 function to suppress the increase.

In the case that the thickness of the Sn layer is decreased as compared with the thickness in general uses in order to reduce the friction coefficient when the terminal is fitted, thereby attempting to decrease insertion force of a terminal, the base metal becomes to easily diffuse in the outermost surface. However, by providing two intermediate layers, the Ni layer 103 and the Cu layer 102, the diffusion of the component element (Al) of the base material and Zn in the Sn layer 105 can effectively be suppressed. Furthermore, by providing the Cu layer 102 on the Ni layer 103, the phenomenon that Ni directly contacts Sn and diffuses in Sn can be prevented.

According to the connector terminal 1B, because the Zn layer 101 is formed by electroless plating, and the Ni layer 103, the Cu layer 102 and the Sn layer 105 are formed by electrolytic plating, clean layer structure can be prepared with good efficiency.

Furthermore, because the thickness of the Zn layer 101 is set to the range from 0.1 µm to 2.0 µm, the thickness of the Ni layer is set to the range from 0.1 µm to 2.0 µm, the thickness of the Cu layer is set to the range from 0.1 µm to 0.7 µm and the thickness of the Sn layer is set to the range from 0.3 µm to 1.2 µm, electrical contact reliability and terminal fittability when fitted to a mating connector terminal can be enhanced.

That is, where the thickness of the Sn layer 105 as the outermost surface is less than 0.3 µm, in the case of being applied to a vehicle-mounted connector, the Sn layer 105 abrades and a base is easily exposed, leading to deterioration of contact reliability. On the other hand, where the thickness of the Sn layer 105 exceeds 1.2 µm, such a thickness leads to an increase in insertion force when fitted to a mating connector terminal, resulting in deterioration of terminal fittability.

Where the thickness of the Cu layer 102 provided to prevent diffusion of Zn and Ni in the Sn layer 105 is less than 0.1 µm, the barrier effect of suppressing diffusion of Zn and Ni in the Sn layer is impaired. On the other hand, where the thickness of the Cu layer 102 exceeds 0.7 µm, the thickness of a Cu—Sn alloy layer is increased by diffusion of Cu element itself in the surface of the Sn layer 105, leading to deterioration of contact reliability.

Where the thickness of the Ni layer 103 provided to prevent diffusion of the component element (Al) of the base material 100 and Zn in the Sn layer 105 is less than 0.1 µm, the barrier effect of suppressing the diffusion of the base material component element (Al) and Zn in the Sn layer 105 is impaired. On the other hand, where the thickness of the Ni layer 103 exceeds 2.0 µm, such a thickness affects springback characteristics when crimping, leading to deterioration of contact reliability of the crimping section.

Where the thickness of the Zn layer 101 is less than 0.1 µm, electrodeposition property of Ni plating applied to the Zn layer 101 is impaired. On the other hand, where the thickness of the Zn layer 101 exceeds 2.0 µm, productivity is impaired as a consequence of electroless plating.

Figure 6:
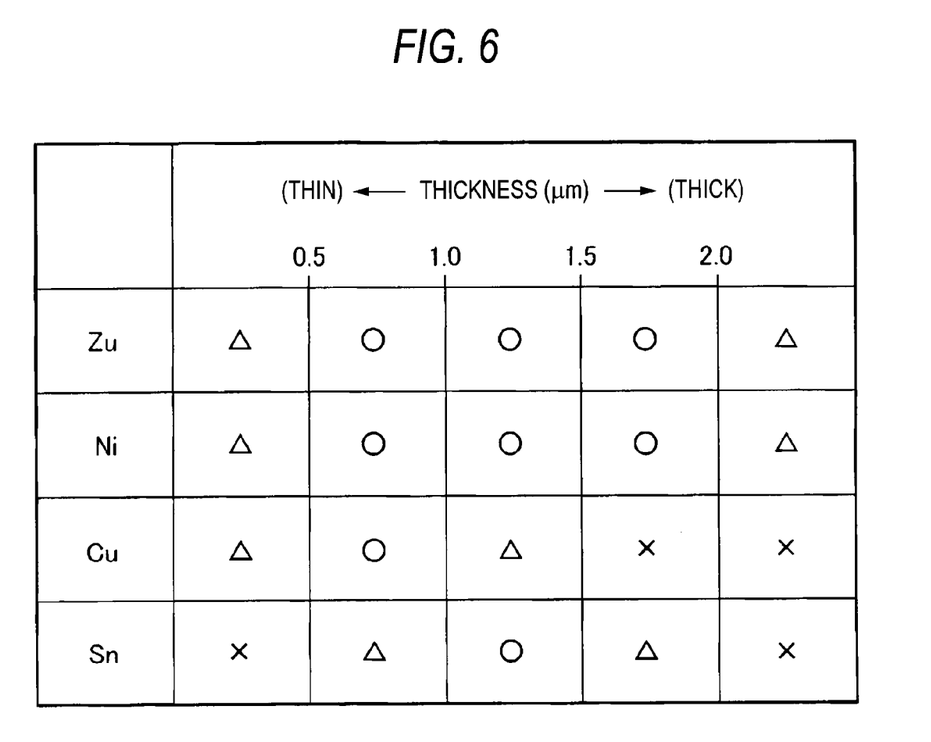
FIG. 6 is an explanatory view showing evaluation contents of thicknesses of a Zn layer, an Ni layer, a Cu layer and an Sn layer in the layer structure of the surface of the connector terminal of the second embodiment.

FIG. 6 shows the evaluation contents of the thicknesses of the Zn layer 101, the Ni layer 103, the Cu layer 102 and the Sn layer 105. In the column of evaluation, "o" means "Good", and "x" means "Poor". The physical quantities as evaluation object in the drawing are the same as described before.

This application is based on Japanese Patent Application No. 2009-124263 filed May 22, 2009, the disclosures of which are incorporated herein by reference.

INDUSTRIAL APPLICABILITY

The connector terminal according to the present invention is lightweight as compared with a copper terminal, and can be crimped to an aluminum electric wire without overcrimping. Therefore, the connector terminal can effectively be used in a wire harness for automobile in which reduction in weight is required.

DESCRIPTION OF REFERENCE NUMERALS AND SIGNS 1A, 1B Connector terminal
10 Electrical contact section
12 Conductor crimping section
100 Base material
101 Zn layer
102 Cu layer
103 Ni layer
105 Sn layer

The invention claimed is:
1. A connector terminal comprising:
an electrical contact section that is brought into contact and conducted with a mating connector terminal by fitting to the mating connector terminal; and
a conductor crimping section that is crimped to the conductor of an electric wire,
wherein a metal material which constitutes the connector terminal has a base material based on an aluminum or an aluminum alloy, a Zn layer and a Cu layer are formed in sequence on a surface of the base material, and an Sn layer is formed on the outermost surface, wherein the Zn layer is formed by electroless plating, and the Cu layer and the Sn layer are formed by electrolytic plating, and wherein a thickness of the Zn layer is set to a range from 0.1 µm to 2.0 µm, a thickness of the Cu layer is set to a range from 0.5 µm to 1.0 µm, and a thickness of the Sn layer is set to a range from 0.7 µm to 1.7 µm.

2. A connector terminal comprising:

an electrical contact section that is brought into contact and conducted with a mating connector terminal by fitting to the mating connector terminal; and a conductor crimping section that is crimped to the conductor of an electric wire, wherein a metal material which constitutes the connector terminal has a base material based on an aluminum or an aluminum alloy, a Zn layer, an Ni layer and a Cu layer are formed in sequence on a surface of the base material, and an Sn layer is formed on the outermost surface, wherein the Zn layer is formed by electroless plating, and the Ni layer, the Cu layer and the Sn layer are formed by electrolytic plating, and wherein a thickness of the Zn layer is set to a range from 0.1 µm to 2.0 µm, a thickness of the Ni layer is set to a range from 0.1 µm to 2.0 µm, a thickness of the Cu layer is set to a range from 0.1 µm to 0.7 µm, and a thickness of the Sn layer is set to a range from 0.3 µm to 1.2 µm.

* * * * *